US005716126A

United States Patent [19]

Meyer

[11] Patent Number: 5,716,126

[45] Date of Patent: Feb. 10, 1998

[54] MOBILE FLOOR LAMP

[76] Inventor: Raymond F. Meyer, 2712 Heathfield Rd., Bloomfield Hills, Mich. 48301

[21] Appl. No.: 508,662

[22] Filed: Jul. 28, 1995

[51] Int. Cl.$^{6}$ .............................. F21S 1/12; F21V 21/26; F21V 21/28

[52] U.S. Cl. .............................. 362/287; 362/418; 362/419; 362/427

[58] Field of Search .............................. 362/418, 419, 362/426, 427, 431, 390, 287, 61

[56] References Cited

U.S. PATENT DOCUMENTS

| | | | |
|---|---|---|---|
| 4,803,606 | 2/1989 | Rotter | 362/419 |
| 5,023,755 | 6/1991 | Rosenberg | 326/419 |
| 5,088,014 | 2/1992 | Boughey | 362/418 |
| 5,126,928 | 6/1992 | Hughes | 362/419 |
| 5,424,931 | 6/1995 | Wheeler | 362/418 |
| 5,448,464 | 9/1995 | Moss | 362/419 |

*Primary Examiner*—Ira S. Lazarus
*Assistant Examiner*—Matthew Spark

[57] ABSTRACT

A mobile floor light comprising a vertical mast having an upper end and a lower end with a cylindrical surface therebetween; a base secured to the lower end of the mast; a plurality of casters symmetrically secured to the base and adapted to rest on a recipient surface such as a floor; a rigid linear boom with an interior end and an exterior end; first adjustable securement components at the interior end of the boom and the upper end of the mast including a first locking lever movable between a first position wherein the boom angle may be varied with respect to the mast and a second position wherein the boom angle may be fixed with respect to the mast; a light head with a bulb; and second adjustable securement components at the exterior end of the boom and the light head including a second locking lever movable between a first position wherein the light head angle may be varied with respect to the boom and a second position wherein the light head angle may be fixed with respect to the mast.

5 Claims, 3 Drawing Sheets

14
66
62
18
12
10
66
70
16
22
26
20

14
66
62
18
12
10
66
70
16
22
26
20

52
59
58
57
46
48
62
61

FIG 5
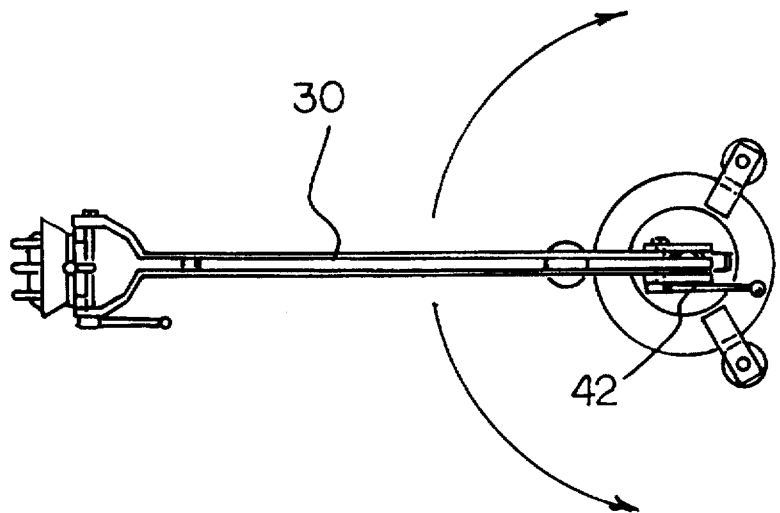
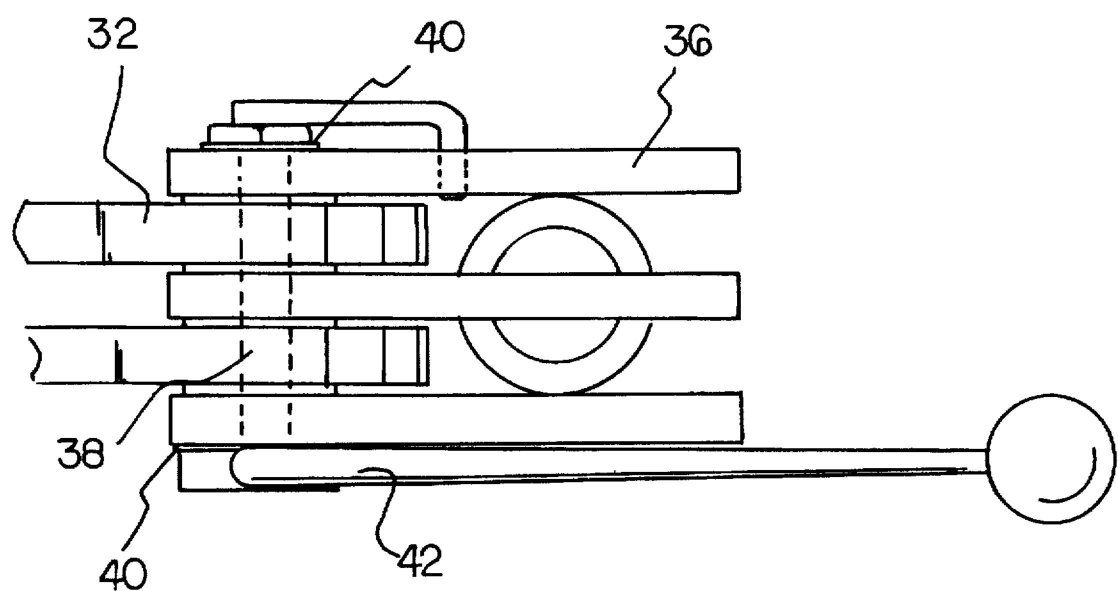
FIG 6

MOBILE FLOOR LAMP

BACKGROUND OF THE INVENTION

1. Field of the Invention

The present invention relates to a mobile floor lamp and, more particularly, pertains to illuminating a wide variety of hard to reach areas through a stand on casters with a multipositionable light.

2. Description of the Prior Art

The use of floor lamps of various designs and configurations is known in the prior art. More specifically, floor lamps of various designs and configurations heretofore devised and utilized for the purpose of illuminating intended areas by various methods and apparatuses are known to consist basically of familiar, expected, and obvious structural configurations, notwithstanding the myriad of designs encompassed by the crowded prior art which has been developed for the fulfillment of countless objectives and requirements.

By way of example, consider the prior art in U.S. Pat. No. 5,117,345 to Baake.

Consider U.S. Pat. No. 5,029,055 to Lindh.

Consider U.S. Pat. No. 5,099,404 to Kenum.

Consider U.S. Pat. No. 5,272,609 to Nelson.

Consider U.S. Pat. No. 4,181,928 to Zelina.

Lastly, consider U.S. Pat. No. Des. 319,511 to Humphery.

In this respect, the mobile floor lamp according to the present invention substantially departs from the conventional concepts and designs of the prior art, and in so doing provides an apparatus primarily developed for the purpose of illuminating a wide variety of hard to reach areas through a stand on casters with a multipositionable light.

Therefore, it can be appreciated that there exists a continuing need for a new and improved mobile floor lamp which can be used for illuminating a wide variety of hard to reach areas through a stand on casters with a multipositionable light. In this regard, the present invention substantially fulfills this need.

SUMMARY OF THE INVENTION

In view of the foregoing disadvantages inherent in the known types of floor lamps of various designs and configurations now present in the prior art, the present invention provides an improved floor lamps. As such, the general purpose of the present invention, which will be described subsequently in greater detail, is to provide a new and improved mobile floor lamp and method which has all the advantages of the prior art and none of the disadvantages.

To attain this, the present invention essentially comprises a new and improved mobile floor light comprising, in combination a vertical mast having an upper end and a lower end with a cylindrical surface therebetween and a central axis therewithin; a base with a circular periphery secured to the lower end of the mast; three casters symmetrically secured to the base and adapted to rest on a recipient surface such as a floor, the casters adding mobility to the base and mast and components secured thereto; a rigid linear boom with an interior end and an exterior end; first adjustable securement components at the interior end of the boom and the upper end of the mast including a first machine screw, thrust washers and a locking lever movable between a first position wherein the boom angle may be varied with respect to the mast and a second position wherein the boom angle may be fixed with respect to the mast; a light head with a bulb; second adjustable securement components at the exterior end of the boom and the light head including a second machine screw, thrust washers and a locking lever movable between a first position wherein the light head angle may be varied with respect to the boom and a second position wherein the light head angle may be fixed with respect to the mast; an electrical cord coupling the bulb to a source of potential; cord winder brackets secured to the mast for receiving the cord; and a neoprene bumper on the mast on the side thereof remote from the cord winders.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mobile floor lamp which has all the advantages of the prior art floor lamps of various designs and configurations and none of the disadvantages.

It is another object of the present invention to provide a new and improved mobile floor lamp which may be easily and efficiently manufactured and marketed.

It is a further object of the present invention to provide a new and improved mobile floor lamp which is of a durable and reliable construction.

An even further object of the present invention is to provide a new and improved mobile floor lamp which is susceptible of a low cost of manufacture with regard to both materials and labor, and which accordingly is then susceptible of low prices of sale to the consuming public, thereby making such floor lamps of various designs and configurations economically available to the buying public.

Still yet another object of the present invention is to provide a new and improved mobile floor lamp which provides in the apparatuses and methods of the prior art some of the advantages thereof, while simultaneously overcoming some of the disadvantages normally associated therewith.

Even still another object of the present invention is to illuminating a wide variety of hard to reach areas through a stand on casters with a multipositionable light.

Lastly, it is an object of the present invention to provide a mobile floor light comprising a vertical mast having an upper end and a lower end with a cylindrical surface therebetween; a base secured to the lower end of the mast;

a plurality of casters symmetrically secured to the base and adapted to rest on a recipient surface such as a floor; a rigid linear boom with an interior end and an exterior end; first adjustable securement components at the interior end of the boom and the upper end of the mast including a first locking lever movable between a first position wherein the boom angle may be varied with respect to the mast and a second position wherein the boom angle may be fixed with respect to the mast; a light head with a bulb; and second adjustable securement components at the exterior end of the boom and the light head including a second locking lever movable between a first position wherein the light head angle may be varied with respect to the boom and a second position wherein the light head angle may be fixed with respect to the mast.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top plan view of the present invention.

FIG. 6 is a enlarged view of the boom handle of the present invention.

The same reference numerals refer to the same parts throughout the various Figures.

DESCRIPTION OF THE PREFERRED EMBODIMENT

Figure 1:
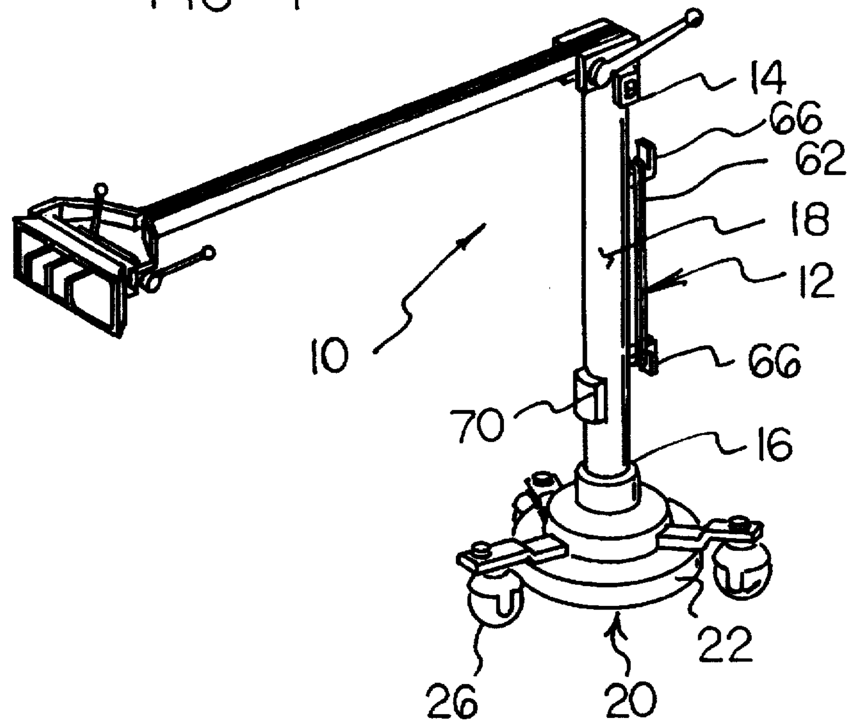
FIG. 1 is a perspective illustration of the preferred embodiment of the mobile floor lamp constructed in accordance with the principles of the present invention.
Figure 2:
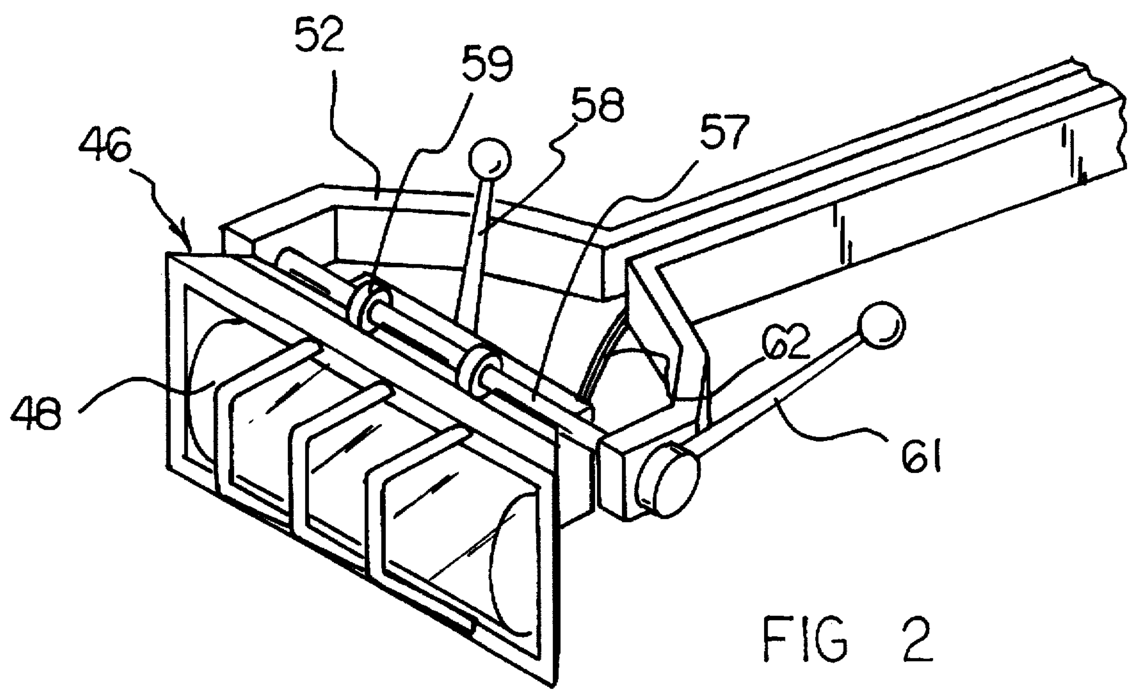
FIG. 2 is an enlarged perspective illustration of the lamp portion of the present invention.
Figure 3:
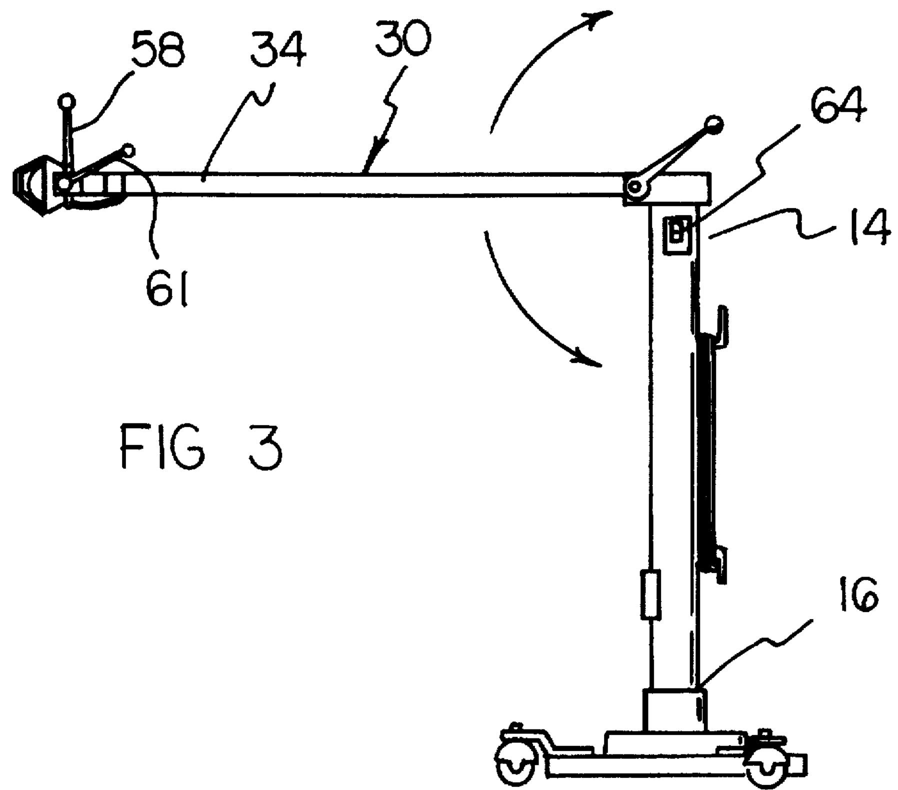
FIG. 3 is a side elevational view of the present invention.
Figure 4:
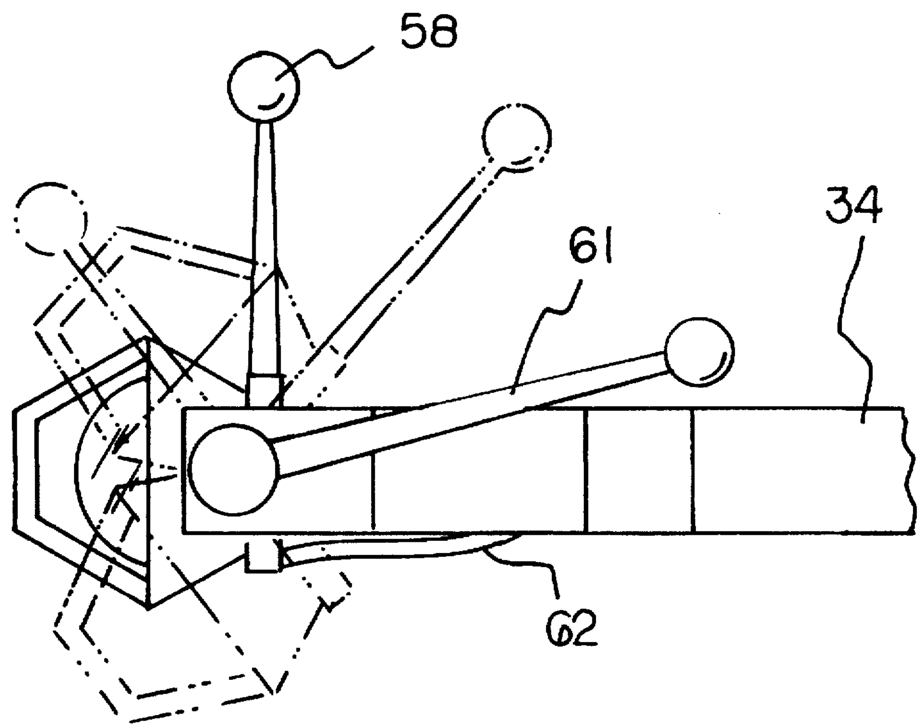
FIG. 4 is an enlarged side elevational view of the lamp control handle of the present invention.

With reference now to the drawings, and in particular to FIG. 1 thereof, the preferred embodiment of the new and improved mobile floor lamp embodying the principles and concepts of the present invention and generally designated by the reference numeral 10 will be described.

The present invention, the new and improved mobile floor lamp, is a system 10 comprised of a plurality of components. In their broadest context, the components include a mast, a base, casters, a boom, a head with a bulb and adjustable securement components. Each of the individual components is specifically configured and correlated one with respect to the other so as to attain the desired objectives.

More specifically, the system 10 of the present invention includes a vertical mast 12. The mast has an upper end 14 and a lower end 16. A cylindrical surface 18 extends between the upper and lower ends. The mast has a central axis extending vertical through the length of the mast.

Next provided is a base 20. The base has a circular periphery 22. The base is formed of plural concentric circular sections. The upper end of the base is secured to the lower end of the mast.

Three casters 26 are symmetrically secured to the base at its periphery, 120 degrees apart. The casters are adapted to rest on a recipient surface such as a floor. The casters add mobility to the base and the mast as well as the components secured thereto as will be later described.

A rigid linear boom 30 is next provided. The boom is formed with an interior end 32 as well as an exterior end 34. The interior end of the boom has three extending members 36 perpendicularly coupled to the upper end of the vertical mast.

First adjustable securement components are provided at a location adjacent to the interior end of the boom and the upper end of the mast. Such components include a first machine screw 38, thrust washers 40 and a locking lever 42. The screw 38 extends through interior end of the boom and the three vertically extending members 36 at the upper end of the mast. The thrust washers 40 are mounted on the screw and are axially shiftable by movement of the lever 42. The washers are also spaced to be located between the three vertically extending members 36 as well as the parallel interior ends of the boom 30. The lever 42 is coupled to the head of the machine screw 38 for concurrent rotation. A nut is threadedly engaged with the machine screw 30 and secured against rotation by an L-shaped piece attached to the adjacent vertically extending member 36. The lever and machine screw are movable by a user between a first unlocked position wherein the components between the head of the machine screw and its nut are loosened whereby the boom angle may be varied with respect to the mast and a second locked position wherein the components between the head of the machine screw and its nut are tightened whereby the boom angle may be fixed with respect to the mast.

A light head 46 with a bulb 48 for illumination purposes is next provided. The head is located between parallel extensions 50 at the exterior end of the boom. The head is located between parallel extensions 50 that have forked end portions 52 at the exterior of the boom.

Second adjustable securement components are next provided. Such components function similarly to the first adjustment components described above but are located at the exterior end of the boom adjacent to the light head. Such components include a second machine screw, three hollow cylinders 57, two support rings 59 and a lever 61. The locking lever 61 is movable between a first unlocked position wherein the light head angle may be varied with respect to the boom and a second locked position wherein the light head angle may be fixed with respect to the boom. More specifically, the second machine screw extends through spaced parallel arms at the exterior end of the boom and the two support rings 59 attached to the light head 46. The three hollow cylinders 57 are mounted on the screw and are axially shiftable by movement of the lever 61. The cylinders are also spaced to be located between the two parallel arms as well as the rings. The lever 61 is coupled to the head of the machine screw for concurrent rotation. A nut is threadedly engaged with the machine screw and secured against rotation as in the first adjusting components. The lever and machine screw are movable by a user between a first unlocked position wherein the components between the head of the machine screw and its nut are loosened whereby the lamp head angle may be varied with respect to the boom and a second locked position wherein the components between the head of the machine screw and its nut are tightened whereby the lamp head angle may be fixed with respect to the boom.

One additional handle is also provided. This is a handle 58 which is centrally secured to the rear end of the lamp head. Such handle extend upwardly and is adapted to be grasped by the user when manipulating the lamp head and/or the device generally. Grasping another part of the device other than the handle could be uncomfortable to the user or in some circumstances cause physical harm due to the heat generated by the lamp head after prolonged use.

Power is provided to the bulb through an electrical cord 62. The cord is essentially conventional and couples the bulb to a source of potential during operation and use of the apparatus. A switch 64 is in the line of the cord for activating and inactivating the bulb, again in the conventional manner.

Cord winder brackets 66 are provided and secured to the mast for receiving the cord. Such brackets are of an essentially L-shaped configuration with their free ends facing in opposite directions.

Lastly provided is a neoprene bumper 70 on the mast. It is positioned on the side thereof remote from the cord winder brackets.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved mobile floor light comprising, in combination:

a vertical mast having an upper end and a lower end with a cylindrical surface therebetween and a central axis therebetween;

a base with a circular periphery secured to the lower end of the mast;

three casters symmetrically secured to the base and adapted to rest on a recipient surface, the casters adding mobility to the base and mast and components secured thereto;

a rigid linear boom with an interior end and an exterior end;

first adjustable securement components at the interior end of the boom and the upper end of the mast including a first machine screw, thrust washers and a locking lever movable between a first position wherein the boom and mast form an angle which may be varied and a second position wherein the angle between the boom and mast may be fixed;

a light head with a bulb;

second adjustable securement components at the exterior end of the boom and the light head including a second machine screw, thrust washers and a locking lever movable between a first position wherein the light head angle may be varied with respect to the boom and a second position wherein the light head angle may be fixed with respect to the mast;

an electrical cord coupling the bulb to a source of potential;

cord winder brackets secured to the mast for receiving the cord; and a neoprene bumper on the mast remote from the cord winders.

2. A mobile floor light comprising:

a vertical mast having an upper end and a lower end with a cylindrical surface therebetween;

a base secured to the lower end of the mast;

a plurality of casters symmetrically secured to the base and adapted to rest on a recipient surface;

a rigid linear boom with an interior end located over the base and an exterior end laterally offset from the base in cantilever fashion;

a pivot adjacent to the interior end of the boom and the upper end of the mast with first adjustable securement components thereat including a first locking lever movable between a first position wherein the boom may be varied with respect to the mast and a second position wherein the boom may be fixed with respect to the mast;

a light head with a bulb;

second adjustable securement components at the exterior end of the boom and the light head including a second locking lever movable between a first position wherein the light head angle may be varied with respect to the boom and a second position wherein the light head angle may be fixed with respect to the mast; and a neoprene bumper on the mast on the side thereof remote from the cord winders.

3. The apparatus as set forth in claim 2 and further including an electrical cord operatively coupling the bulb to a source of potential.

4. The apparatus as set forth in claim 2 and further including cord winder brackets secured to the mast for receiving the cord.

5. The apparatus as set forth in claim 2 wherein the adjustable securement components include a machine screw coupled to a lever for rotation therewith and a nut threadably coupled thereto but fixedly positioned against rotation and with means therebetween to be tightened for position securement and to be loosened for position adjustment.

* * * * *